INVENTORS
RICHARD FRANCIS BUKACEK
SANFORD A. WEIL

BY Alexander & Speckman
ATTYS.

INVENTORS
RICHARD FRANCIS BUKACEK
SANFORD A. WEIL
BY
*Alexander & Speckman*
ATTYS.

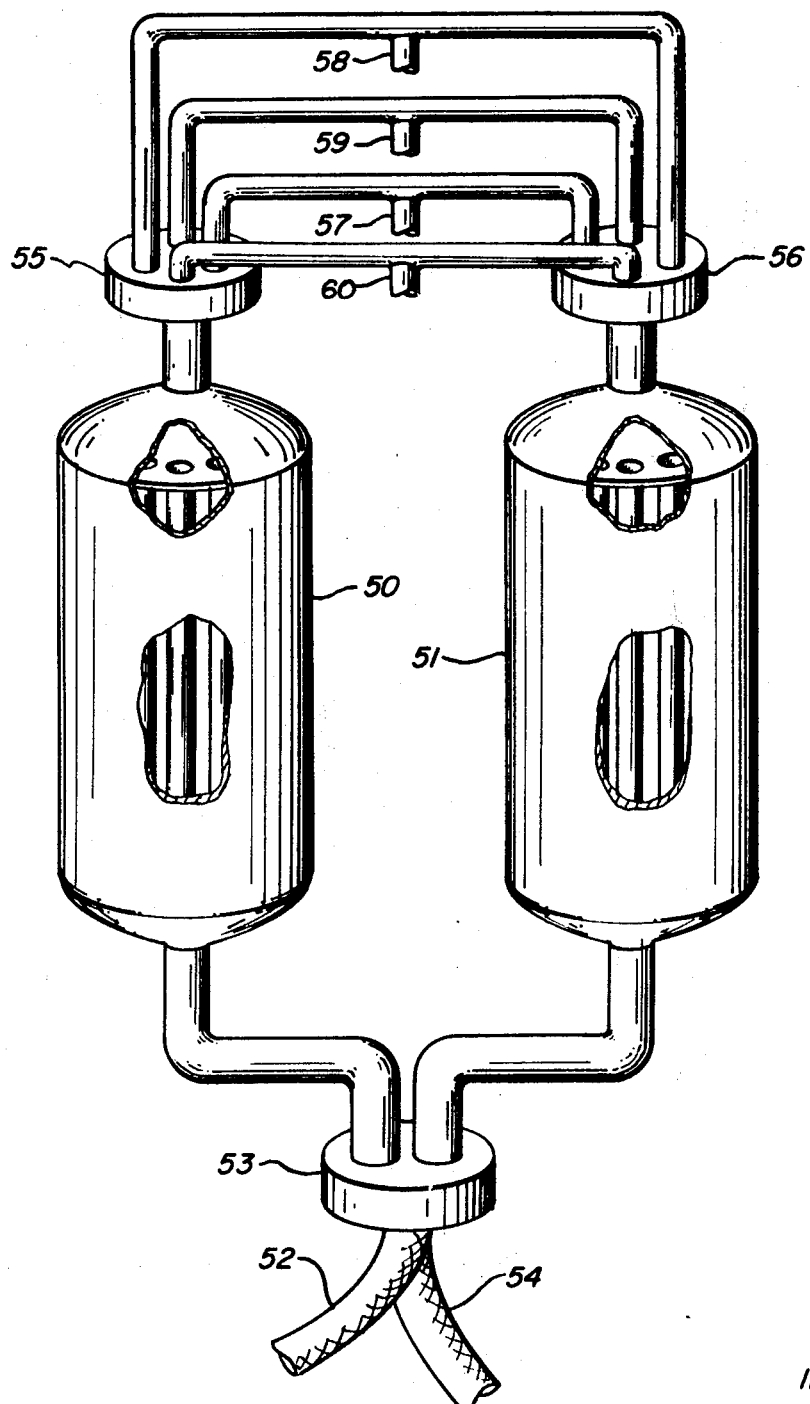

United States Patent Office 3,606,015
Patented Sept. 20, 1971

3,606,015
HEAT-REGENERATIVE SEPARATOR AND METHOD
Richard Francis Bukacek and Sanford A. Weil, Chicago, Ill., assignors to The Institute of Gas Technology, Chicago, Ill.
Filed Nov. 28, 1969, Ser. No. 880,731
Int. Cl. C02b *1/18;* F28d *17/00*
U.S. Cl. 210—59
6 Claims

ABSTRACT OF THE DISCLOSURE

A heat-regenerative separator and method which uses a heat-regenerative element having a heat-regenerative material at phase-change temperature to impart to or receive from an imput fluid latent heat of separation thereby causing separation from said input fluid a product of a phase different than the input fluid which product will subsequently be withdrawn from the separation area in a withdrawal fluid when said heat-regenerative material receives from or imparts to said withdrawal fluid latent heat of decomposition of said product into said withdrawal fluid, said method comprising alternating passage of input fluid and withdrawal fluid in heat-exchange relation with said heat-regenerative element.

---

Today's chemical technologies require improved reaction facilities. Particularly, a need exists for devices which can impart large amounts of thermal energy to accomplish various separations, by reaction or other phase change. The approach in the past has been to use greater amounts of energy from outside sources. High operating expenses are an undesirable result of this approach.

If a product which has been separated from an input fluid by the addition of heat thereto or removal of heat therefrom may be withdrawn from the separation area by a removal or addition of heat to a withdrawal fluid subsequently in contact with the said product, then operating expenses may be reduced by the use of a heat regenerator to add or remove heat at the proper time. That is, if addition of thermal energy is required for one part of the process and removal is required for another, the use of energy from outside sources may be minimized by use of a heat regenerator.

Heat regeneration was not, in the past, a generally practical solution to the problem of high costs in the operation of separators because regeneration of large amounts of heat energy required large volumes of heat-regenerative material and large heat-exchange surface areas, both resulting in high equipment costs and space requirements.

Furthermore, increasing the volume of heat-regenerative material yields rapidly diminishing increments of increase in heat transfer because heat conduction rapidly decreases as the distance from the heat-exchange surface increases. The use of liquid for the heat-regenerative material would overcome one aspect of this problem because its fluidity allows circulation, but this is accomplished at the cost of lower conductivity and lower heat capacity per unit volume. Increasing the available heat transfer surface area, on the other hand, requires much more complicated equipment. Large masses of heat-regenerative material and large surface areas in contact therewith both require bulky equipment and the resulting high equipment outlays and operating costs. Neither approach provides a source of heat regeneration which may be used efficiently in a separator.

Our invention provides a heat-regenerative separator and method which overcomes the above-mentioned problems. Our invention provides a compact heat-regenerative separator and a method furnishing an efficient and completely new concept in separators.

The use of suitable material at phase-change temperature provides heat-regenerative material with large heat capacity. By using material that is alternately frozen and melted, condensed and vaporized, dissolved and precipitated, or reacted from one energy level to another and reversed, the volume of heat-regenerative material for a given heat load is much smaller than the volume of material not at phase change required for the same heat load, unless unacceptably large temperature changes are contemplated. The volume advantage of using material undergoing phase transition as heat-regenerative material is illustrated by contrasting the volume necessary to absorb a given heat load using a steel regenerator undergoing a temperature change of 10° F. and water undergoing freezing. The ratio of volume of steel to volume of water is about 20 to 1. The use of heat-regenerative material at phase-change temperature provides heat transfer efficiency, making a heat-regenerative separator a practical device.

The device may be used in any situation in which a product of a different phase than the input fluid may be separated from an input fluid by the addition or removal of heat, and be carried away in a withdrawl fluid after being decomposed therein by virtue of the removal or addition of heat to the product and withdrawal fluid. If heat is to be added to provide latent heat of separation in the input fluid, it is necessary that decomposition require removal of latent heat of decomposition from the withdrawal fluid. That is, if latent heat of separation is added to the input fluid, latent heat of decomposition must be removed from the withdrawal fluid, and vice versa. In other words, with respect to the process fluids, that is, the input fluid and the withdrawal fluid, if heat is imparted to one by the heat-regenerative material, it must be received from the other by the heat-regenerative material.

While the freezing phase change is preferred in the heat-regenerative material, other phase changes can be used. Heat-regenerative material which undergoes condensation and vaporization, solution and precipitation or any reversible reaction is suitable. We refer principally to solids and liquids herein for purposes of explanation only and do not intend thereby to limit in any way the phase changes of heat-regenerative material to which this invention may apply.

Similarly, although the separation for which the separator is used must involve a phase change in which a product of a phase different than the phase of the input fluid is formed and subsequently decomposed, no particular type of separation is required. The separator may be used for precipitation of a solute, freezing of a liquid, formation of a salt, formation of a hydrate, or any other reaction in which a product is separated and later may be carried away in a withdrawal fluid. We refer to the product as a solid herein for purposes of explanation only, as gases may be separated from liquids and liquids condensed from gases.

In the same way, decomposition of the product into the withdrawal fluid must involve a phase change. However, the decomposition may be solution, chemical reaction, melting or anything by which a product may go into a withdrawal fluid upon the addition or removal of heat.

It is one object of our invention to provide a heat-regenerative separator and method in which a heat-regenerative material undergoing a phase change is used for the regeneration of thermal energy to accomplish separation and subsequent withdrawal from the separation area of the product separated.

A further object of our invention is to provide a device and method for purification of water.

A still further object of our invention is to provide a device and method which provides efficient acquisition of a product separated from an input fluid by the addition or removal of heat.

Yet another object is to provide an efficient separator device requiring a small amount of energy from outside sources for separation of a reaction product.

These and other important objects will become apparent from the following description and the drawings showing the preferred embodiments wherein:

FIG. 6 is a perspective cutaway view of another embodiment of a heat-regenerative separator using heat-regenerative material at phase-change temperature.

Figure 1:
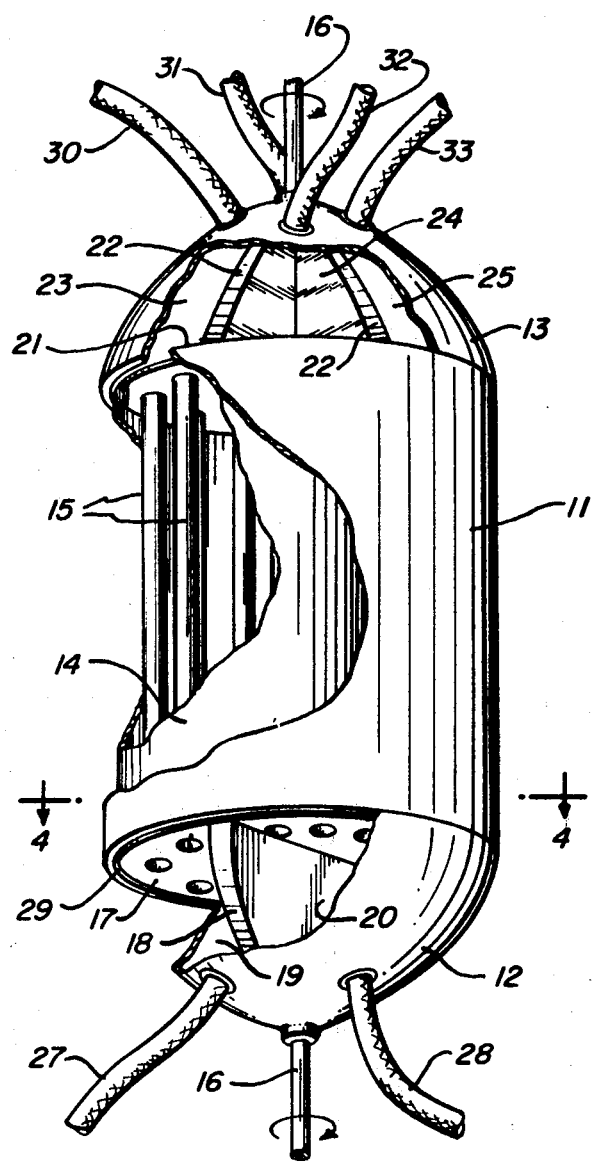
FIG. 1 is a perspective cutaway view of a heat-regenerative separator of this invention utilizing a heat-regenerative material at phase-change temperature.
Figure 3:
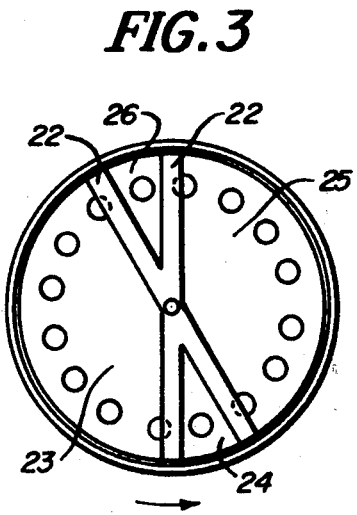
FIG. 3 is a top view of FIG. 1 with the top casing cap removed.
Figure 4:
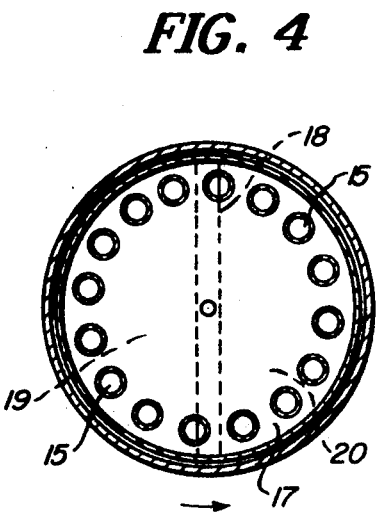
FIG. 4 is a section view of the device of FIG. 1 as shown at section 4—4 in FIG. 1.

Referring specifically to FIG. 1, a device of this invention is shown having cylindrical casing 11, and attached bottom casing cap 12 and top casing cap 13. Enclosed in the casing is tank 14 containing heat-regenerative material at phase-change temperature and having one or more tubes 15 passing in fluid-tight relation through the heat-regenerative material in the tank and providing communication through the tank. The tank is free to rotate about an axis 16 extending lengthwise through the middle of the tank, and is rotated by means of a motor not shown. Inlet partition 18 and bottom casing cap 12 comprise the first partitioned cap structure. The first partitioned cap structure and tank inlet end 17 define two stationary inlet reservoirs, first inlet reservoir 19 and second inlet reservoir 20, as shown in FIGS. 1 and 4, each containing fluid to be processed by the separator. Outlet partitions 22 and top casing cap 13 comprise the second partitioned cap structure. The second partitioned cap structure and tank outlet end 21 define four stationary outlet reservoirs, first outlet reservoir 23, second outlet reservoir 24, third outlet reservoir 25 and fourth outlet reservoir 26, as shown in FIGS. 1 and 3, each containing a processed fluid. A first process fluid enters inlet reservoir 19 through feedline 27 and a second process fluid enters inlet reservoir 20 through feedline 28. The process fluids are prevented from entry into the space between the casing and the tank by seal 29, either fixed to the casing and against which the tank inlet end slides as the tank rotates, or fixed to the rotating tank and sliding against the stationary casing. The pressures in the feedlines are maintained by an external pumping means not shown, thereby causing the process fluids to pass through the tubes to the outlet reservoirs. The process fluids, having been processed, are withdrawn from outlet reservoirs 23, 24, 25 and 26 through exit lines 30, 31, 32 and 33 respectively. The process fluids, while in the outlet reservoirs are prevented from entering the space between the casing and the tank by a seal in similar manner as seal 29. The partitioned cap structures are thus in fluid-tight relation with their respective tank ends.

The term process fluid as used herein applies to both input fluids and withdrawal fluids.

Figure 2:
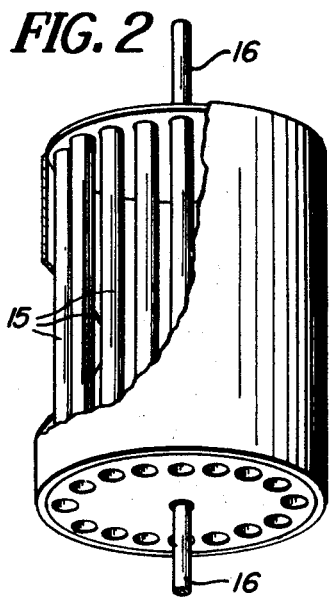
FIG. 2 is a perspective cutaway view of a sealed tank as partially shown in FIG. 1, for containing a heat-regenerative material at phase change temperature for use in a heat-regenerative separator.

Referring specifically to FIG. 2, a tank as in FIG. 1 is shown having a cylindrical body and round inlet and outlet ends each defining one or more apertures connected by tubes sealed thereto allowing passage of process fluids from inlet reservoirs to outlet reservoirs. Heat-regenerative material is to be contained in this sealed tank in contact with the outside of the tube walls, the tank and the heat regenerative material comprising a heat-regenerative element. The tubes provide a wall between the heat-regenerative material and the process fluids passing through the tubes.

At the start of the process, the heat-regenerative material may be adjusted to a phase-change temperature, at the lower energy level of its two possible phases. The heat-regenerative material is at a phase-change temperature which is between the temperatures of the two process fluids. As the process fluid having initial temperature higher than the phase-change temperature of the heat-regenerative material passes through a tube of the heat-regenerative element, latent heat of phase change of the heat-regenerative material will be received from the process fluid, causing solid phase of the heat-regenerative material on the outside of the tube wall to change to the liquid phase. The temperature of the heat-regenerative material remains substantially constant. Later, when the other process fluid, with initial temperature lower than the temperature of the heat-regenerative material, passes through the same tube, latent heat of phase-change of heat-regenerative material will be imparted to the process fluid by the heat-regenerative material through the tube wall, causing solid phase of the heat-regenerative material to form on the outside of the tube wall. Again, the temperature of the heat-regenerative material remains substantially constant. Thus, by alternating the flow of the relatively cool and hot process fluids in cyclic fashion against the inside of the tube wall of the heat-regenerative element, the outside of the wall being in contact with a heat-regenerative material at phase-change temperature, a constantly high and efficient heat transfer rate is maintained.

It is preferred that some of the solid phase of heat-regenerative material always be on the outside of the tube walls. Not only will this maximize the heat transfer, but the temperature of the heat-regenerative material will remain substantially constant. Thus, this invention has special application as an isothermal reactor.

If the process fluid which has a temperature higher than the temperature of the heat-regenerative material is the input fluid, that is, latent heat of separation must be removed to accomplish separation in the input fluid, product will form on the inside of the tube wall as heat is withdrawn from the input fluid by the phase-changing of the heat-regenerative material. Thus, as product is building up on the inside of the tube wall, the solid phase of the heat-regenerative material on the outside of the tube wall is returning to the liquid phase. Subsequently, when the withdrawal fluid, at a temperature lower than the temperature of the heat-regenerative material, is in the tube and in contact with said product, heat of phase change of the heat-regenerative material will pass to the product and withdrawal fluid providing latent heat of decomposition causing product on the inside of the tube wall to decompose into the withdrawal fluid. Thus, while solid phase of the heat-regenerative material is building up on the outside of the tube wall, product is decomposing from the inside of the tube wall.

If, on the other hand, the process fluid which has a temperature lower than the temperature of the heat-regenerative material is the input fluid, that is, latent heat of separation must be added to accomplish separation in the input fluid, product will form on the inside of the tube wall as heat is imparted to the input fluid by the phase-changing of the heat-regenerative material. Thus, as product is building up on the inside of tube wall, heat-regenerative material is solidifying on the outside of the tube wall. Subsequently, when the withdrawal fluid, at a temperature higher than the temperature of the heat-regenerative material, is in the tube and in contact with product, latent heat of decomposition will pass from the withdrawal fluid to the heat-regenerative material, causing product on the inside of the tube walls to decompose into the withdrawal fluid and the solid phase of the heat-regenetrative material on the outside of the tube wall to return to the liquid phase.

The temperature of a process fluid will not change significantly while separation or decomposition are occurring. Typically, little temperature change of process fluid would be required before said separation or decomposition begins as initial temperature would at or near separation or decomposition temperature. After separation or decomposition has begun, the temperature of a process fluid will remain substantially constant until said separation or decomposition is complete. In the method of our invention, it is preferred that separation or decomposition never be completed with respect to a given portion of process fluid. Thus, temperature of process fluids will remain substantially constant.

An advantage of use of a phase changing heat-regenerative material is the greatly increased heat capacity in the heat-regenerative element. Another is rapid rate of heat transfer. Furthermore, in our invention, a high rate of heat transfer is maintained because the difference in temperature between process fluid and heat-regenerative material will not go significantly below the difference between the phase change temperature of the heat-regenerative material and the separation or decomposition temperature in the process fluids until the separation from or decomposition into process fluids, or phase change of heat-regenerative material is completed.

In the method of our invention, a high rate of thermal conduction will be maintained by regulating the length of the cycle time such that the solids built up on either side of the tube wall are never so thick that conduction is substantially impaired.

Rotation of the tank as shown in FIGS. 1 and 2 accomplishes the aforementioned alternating flow of process fluids within each of the tubes. Referring specifically to FIG. 4, tank inlet end 17 has access to both inlet reservoirs 19 and 20. The fluids in the inlet reservoirs are prevented from intermixing by the inlet partition 18 as shown which has a generally fluid-tight seal against which the tank inlet end rotates. Referring specifically to FIG. 3, tank outlet end 21 has access to each of four outlet reservoirs. The fluids in these reservoirs are prevented from intermixing by outlet partitions 22 which have a generally fluid-tight seal against which the tank outlet end rotates. As the heat-regenerative element rotates, a particular tube is exposed to the process fluid in first inlet reservoir 19 at pressure $P_1$ and initial temperature $T_1$, lower than the temperature of the heat-regenerative material. The process fluid, under pressure, flows through the tube causing the temperature of the tube wall to fall, resulting in the solidification of heat-regenerative material on the outside of the tube wall. If the process fluid is the input fluid, product will, at the same time as heat-regenerative material is solidifying on the outside of the tube wall, form on the inside of the tube wall as heat passes to the input fluid. If, on the other hand, the process fluid is the withdrawal fluid, at the same time as the heat-regenerative material is solidifying on the outside of the tube wall, the product, earlier formed on the inside of the tube wall, will decompose into the withdrawal fluid as heat passes to the withdrawal fluid. As the heat-regenerative element continues to rotate, process fluid from first inlet reservoir 19 continues to enter the tube and exit the tube at pressure $P_1$ into first outlet reservoir 23.

After the heat-regenerative element has rotated one-half cycle and the particular tube has passed the inlet partition, the process fluid in second inlet reservoir 20 will begin to enter the tube. This fluid is at pressure $P_2$ and initial temperature $T_2$, greater than the temperature of the heat-regenerative material. For a period of time just after the process fluid from second inlet reservoir 20 has begun to enter the tube, both process fluids are in the tube at the same time, the second displacing the first. For this reason a second outlet reservoir 24 is provided. The displaced process fluid and any intermingled process fluids at pressure $P_2$ flow into second outlet reservoir 24. When all the residual first process fluid is thus expelled, process fluid from the second inlet reservoir 20 continues passing through the tube causing the temperature of the tube wall to rise, resulting in the return of the liquid phase of part or all of the solidified heat-regenerative material on the outside of the tube wall. The process fluid exits the tube at pressure $P_2$ into third outlet reservoir 25, the tube having moved into position allowing exit thereto. If the process fluid is the input fluid, product will, at the same time as heat-regenerative material in the solid phase on the outside of the tube wall is returning to the liquid phase, form on the inside of the tube wall as heat passes from the input fluid. If, on the other hand, the process fluid is the withdrawal fluid, at the same time as heat-regenerative material in the solid phase on the outside of the tube wall is returning to the liquid phase, product, earlier formed on the inside of the tube wall, will decompose into the withdrawal fluid as heat passes from the withdrawal fluid. As the cycle is completed and the tube begins to admit the process fluid from the first inlet reservoir 19, for a short period of time the first process fluid will displace the second, and the displaced fluid and any intermingled fluids will exit the tube at pressure $P_1$ into fourth outlet reservoir 26. When all the displaced second process fluid and any intermingled process fluids have exited the tube into fourth outlet reservoir 26, the tube will have moved so that the process fluid from first inlet reservoir 19 exits into first outlet reservoir 23.

The degree and speed of separation or decomposition in the process fluids is controlled by several factors, including the initial temperature of the process fluids, the temperature difference between heat-regenerative material and process fluids, the length of exposure to the heat-exchange surface, the heat conduction rate through the tube, heat-regenerative material and product, the diameter of the tube and the cycle time.

If the input fluid is at relatively low temperature and the withdrawal fluid at relatively high temperature, the separation is normally an endothermic process. If the input fluid is at relatively high temperature and the withdrawal fluid is at relatively low temperature, the separation is normally an exothermic process. It will be apparent to those skilled in the art and familiar with this invention what pressure and temperature conditions will be required to accomplish desired separation.

The relative size of outlet reservoirs 24 and 26, used for displacement, with respect to outlet reservoirs 23 and 25 depends on several factors including rate of process fluid flow, rate of tank rotation, degree of process fluid intermingling, that is, solution and mixture of one process fluid with the others, and the difference in pressures of the inlet reservoirs. Thus, with no difference in pressures of the inlet reservoirs, complete immiscibility of process fluids and no mixture thereof, there would be no need for outlet reservoirs 24 and 26. Only two outlet reservoirs would be necessary.

Wide varieties of fluids may be input fluids. Any fluid from which a product of a different phase will separate upon addition or removal of heat is suitable. Solutions of solids in liquids, solutions of gases in liquids, liquids, and mixtures of gases with liquids are illustrative of input fluids.

Wide varieties of fluids may be used as withdrawal fluids, but their selection depends upon the character of the input fluid and the desired state of the final product. Any fluid into which a separation product of a different phase will decompose upon the removal or addition of heat is suitable. Decomposition may be by solution, reaction, melting or the like. Liquids, gases and liquid solutions are illustrative of types of fluids which may be withdrawal fluids.

The heat-regenerative material to be used in any given situation is dependent upon the equilibrium conditions required for separation and decomposition of the product. A heat-regenerative material with phase-change temperature between the temperatures of the process fluids is required. For some applications of this invention it might be preferable to have a heat-regenerative material which has high thermal conductivity, if the solid build-up on the outside of the tube becomes thicker than desired. However, the solid build-up on the outside of the tube may be kept thin by regulation of the speed of the rotation of the heat-regenerative element, and thus will be little impediment to conduction. Another factor bearing on the choice of a heat-regenerative material for a given situation is the amount of latent heat involved in the phase change. The material with a greater latent heat is preferred, if there are no appreciable offsetting disadvantages. Numerous other factors should be taken into consideration including corrosiveness, volatility and the like. Wide varieties of materials may be used as heat-regenerative materials. Any material which undergoes a phase change may be used as heat-regenerative material, taking the aforementioned factors into consideration.

Some preferred materials are acetic acid, lead, and mercury. In each of these the freezing phase change can be used. The vaporization phase change is readily used in materials such as water and ethyl alcohol. An example of a heat-regenerative material which harnesses the phase change of solution and precipitation is a saturated solution of potassium nitrate and water. Some materials are useful in our inveniton by their ability to undergo a reversible chemical reaction. An example is the reaction of ethyl acetate and potassium hydroxide to yield ethyl alcohol and potassium acetate, a salt.

The method, as implemented by the device shown in FIG. 1, of rotating the heat-regenerative element such that the tubes in contact with a heat-regenerative material at phase-change temperature move from one process fluid to the next, is only one manner of implementing our invention. Any means by which a heat-regenerative element, comprised of a contained heat-regenerative material at phase-change temperature, alternately imparts heat to and receives heat from two different process fluids, an input fluid and a withdrawal fluid, will provide the advantages of this invention. Instead of rotating the tank, as shown in FIGS. 1–4, the inlet and outlet reservoirs for the process fluids could be rotated about a fixed tank. Furthermore, it is not necessary that the flow of the process fluids be cocurrent. A countercurrent flow would yield substantially the same benefits. Nor is it necessary that more than one process fluid flow at a given time. Indeed, all the heat-regenerative element can be used for only heating and only cooling in alternate fashion. The device of FIG. 6 incorporates this idea.

Referring specifically to FIG. 6, a heat-regenerative separator with stationary heat-regenerative elements having heat-regenerative material at phase-change temperature is shown, with first regenerative element 50 and second regenerative element 51. The tanks of the heat-regenerative elements are similar in structure to the tank of FIG. 2. A first process fluid is pumped by an external pumping means not shown through feedline 52 into flow switch 53, which is operated by an outside power source not shown. In the same way, a second process fluid is pumped through feedline 54 into the flow switch. The flow switch directs the flow of the process fluids such that each fluid alternately enters the tubes of the first regenerative element and the second regenerative element. That is, when the first process fluid is passing through the tubes of the first regenerative element, the second process fluid is passing through the tubes of the second regenerative element, and then, after the flow switch operates, the first process fluid passes through the tubes of the second regenerative element while the second process fluid is passing through the tubes of the first regenerative element. Thus, while solid phase of heat-regenerative material is building up on the outside of the tube walls of the first regenerative element and product is either forming on or decomposing from the inside of the tube walls as the input fluid or withdrawal fluid is flowing through the tubes of the first regenerative element, the solid phase of heat-regenerative material on the outside of the tube walls of the second regenerative element is returning to the liquid phase and product is either decomposing from or forming on the inside of the tube walls as the withdrawal fluid or input fluid is passing through the tubes of the second regenerative element. For a short period of time after each operation of the flow switch, both process fluids will be in both sets of tubes. Therefore, during the period in which one process fluid is displacing the other, outlet flow switches 55 and 56 will direct the products toward exit line 57 or exit line 60. When process fluids leave the tubes of a regenerative element at their inlet pressures, the outlet flow switch will direct the fluid to either exit line 58 or exit line 59, depending upon which fluid is flowing through the tubes of that regenerative element at that time.

Although tubes providing passage through a heat-regenerative material are used in each of the preferred embodiments, other shapes and structures could also serve the purpose. For example, a group of tubes filled with heat-regenerative material at phase-change temperature, spaced a short distance apart and aligned in a parallel fashion allowing process fluid passageway, could be used. Or a single metal sheet, one side of which is exposed to the heat-regenerative material, could be used. Another manner of implementing the method of this invention is alternating passage of process fluids over a large number of pods or balls filled with a heat-regenerative material at phase-change temperature. The number of structures which could be devised to gain the primary advantages of this invention is large. The configurations which may be used would be obvious to one skilled in the art and familiar with this invention.

The preferred tubes may have cross-sections of any shape, however, round cross-sections are especially preferred. Nor do the tubes have to be straight. Furthermore, the tubes may have fins.

Any suitable materials having sufficient thermal transfer properties, strength and rigidity may be used in construction of the heat-regenerative separator. The materials are dependent on the pressure, temperature and corrosion-resistance requirements which the intended use demands. Normally, the heat-exchange surface will be a material of high thermal conductivity such as copper or steel, but many other factors are to be considered. The aforementioned seals would typically be made of rubber or neoprene or some other polymeric material, again taking all factors into consideration.

The exact size, configuration, structural materials, shape of heat-regenerative element, heat-regenerative material, and volume of heat-regenerative material can be varied greatly without losing the advantage of our invention. The separation for which the invention is fitted is determinative of the choices made.

EXAMPLE

Figure 5:
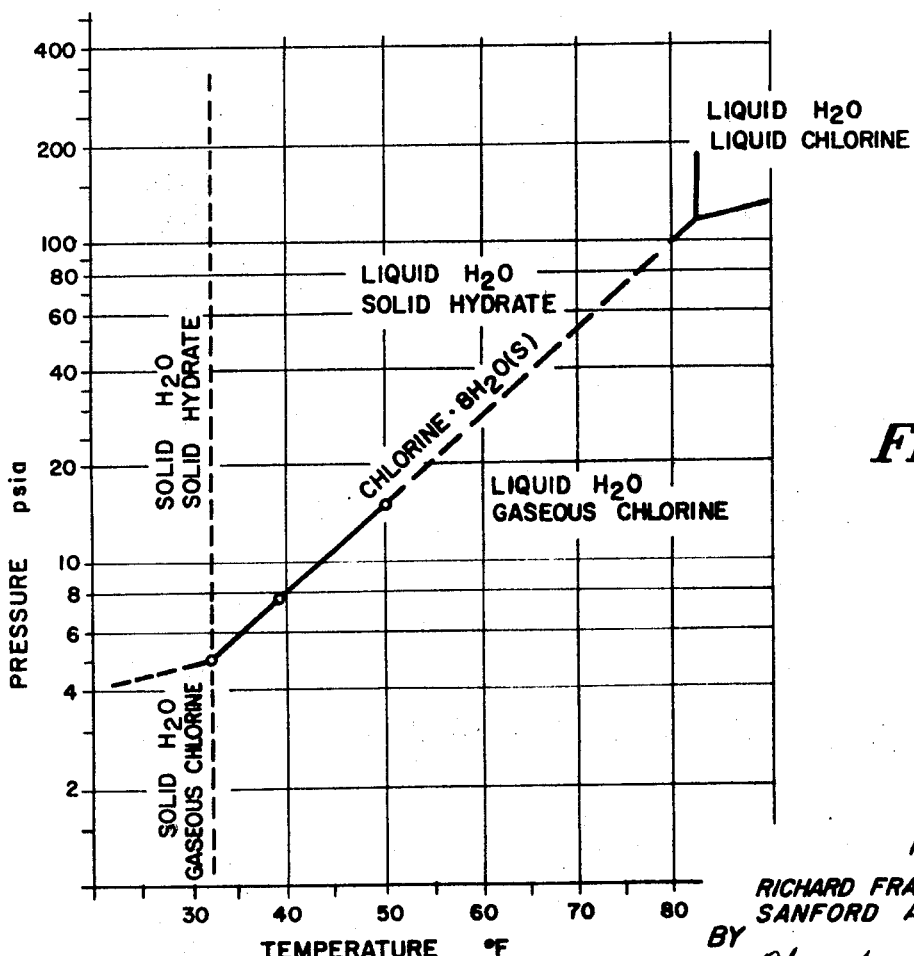
FIG. 5 is a graph of a phase diagram showing the pressure and temperature conditions under which gaseous chlorine in water will react to form chlorine hydrate, and under which chlorine hydrate will decompose into water and gaseous chlorine.

Seawater purification may be accomplished by the use of a heat-regenerative separator of this invention as shown in FIG. 1 by means of a hydration reaction to withdraw water molecules from seawater, and subsequent decomposition into pure water. The input fluid is comprised of seawater and chlorine, a gaseous hydrating agent, dispersed therein. The initial temperature of the input fluid is 76° F. and the pressure is 70 p.s.i.a. Under these conditions, when latent heat of hydration is removed from the input fluid and received by the heat-regenerative material, solid chlorine hydrate, a distinctive molecular association of one molecule of chlorine and eight molecules of water, $Cl_2 \cdot 8H_2O$, will form on the inside of the tube wall. The withdrawal fluid is substantially pure water at an initial temperature of 48° F. and a pressure of 15 p.s.i.a. Under these conditions, addition of latent heat of decomposition will cause the decomposition of the previously formed chlorine hydrate into the withdrawal fluid as pure water and gaseous chlorine. Chlorine is chosen as hydrating agent because the temperature range in which chlorine will form a hydrate with water is quite broad, as FIG. 5 illustrates. The phase change between liquid water with gaseous chlorine and solid chlorine hydrate may be accomplished, with differing pressures, at temperature between approximately 32° F. and approximately 82° F., a 50° range. In this example, as indicated above, we chose a separation temperature high in this range and a decomposition temperature low in this range, but such that all pressures will be above atmospheric pressure. The heat-regenerative material is chosen such that its phase-change temperature is somewhere between the separation temperature and decomposition temperature in the temperature range of hydration phase change. Acetic acid, with a freezing phase-change temperature of 62° F., is chosen as the heat-regenerative material. The temperatures of both the input fluid and the withdrawal fluid will remain substantially constant, as will the temperature of the heat-regenerative material. Thus, a substantially steady rate of heat transfer for hydration and decomposition will be maintained. Maintaining the flow of the input fluid and the withdrawal fluid of this example in the device of FIG. 1 will provide steady product streams of purified water and saline water of an increased salt content. The chlorine gas in the withdrawal fluid after the decomposition process, will be withdrawn, leaving substantially pure water, and may be added again to seawater to form more input fluid.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:
1. A method of separation comprising, alternately passing an input fluid from which a product of a phase different than the phase of the input fluid is formed on a heat-exchange surface of a heat-regenerative element having heat-regenerative material at a phase-change temperature, and a withdrawal fluid which withdraws said product from said heat-exchange surface after decomposition of said product into said withdrawal fluid, said input fluid and said withdrawal flund having differing initial temperatures, in heat-exchange relation with said heat-regenerative element which is alternately receiving and imparting heat, said heat received and imparted being latent heat of phase change of said heat-regenerative material of said element, the higher of said initial temperatures being greater than phase-change temperature of said heat-regenerative material, the lower of said initial temperatures being less than said phase-change temperature of said heat-regenerative material, the temperature at which said product separates from said input fluid being between the initial temperature of the input fluid and said phase-change temperature of said heat-regenerative material, and the temperature at which said product decomposes into said withdrawal fluid being between the initial temperature of the withdrawal fluid and said phase-change temperature of said heat-regenerative material.

2. The method of claim 1 wherein said phase change of said heat-regenerative material is the freezing-melting phase change.

3. The method of claim 1 wherein said phase change of said heat-regenerative material is the vaporization-condensation phase change.

4. The method of claim 1 wherein said phase change of said heat-regenerative material is the solution-precipitation phase change.

5. The method of claim 1 wherein said phase change of said heat-regenerative material is the result of a reversible chemical reaction.

6. The method of claim 1 wherein the temperature at which said product separates from said input fluid is about the initial temperature of said input fluid, and the temperature at which said product decomposes is about the initial temperature of the withdrawal fluid.

References Cited
UNITED STATES PATENTS

| | | | |
|---|---|---|---|
| 2,843,217 | 7/1958 | Linde | 165—7X |
| 2,933,885 | 4/1960 | Benedek et al. | 165—18X |
| 2,966,037 | 12/1960 | Gifford | 165—6X |
| 3,094,479 | 6/1963 | Sweeney | 165—7X |
| 3,119,772 | 1/1964 | Hess et al. | 210—60 |
| 3,155,610 | 11/1964 | Williams | 210—60 |

ALBERT W. DAVIS, JR., Primary Examiner

U.S. Cl. X.R.

23—219, 300; 62—58; 55—269; 165—7, 9, 10